Figure 1:
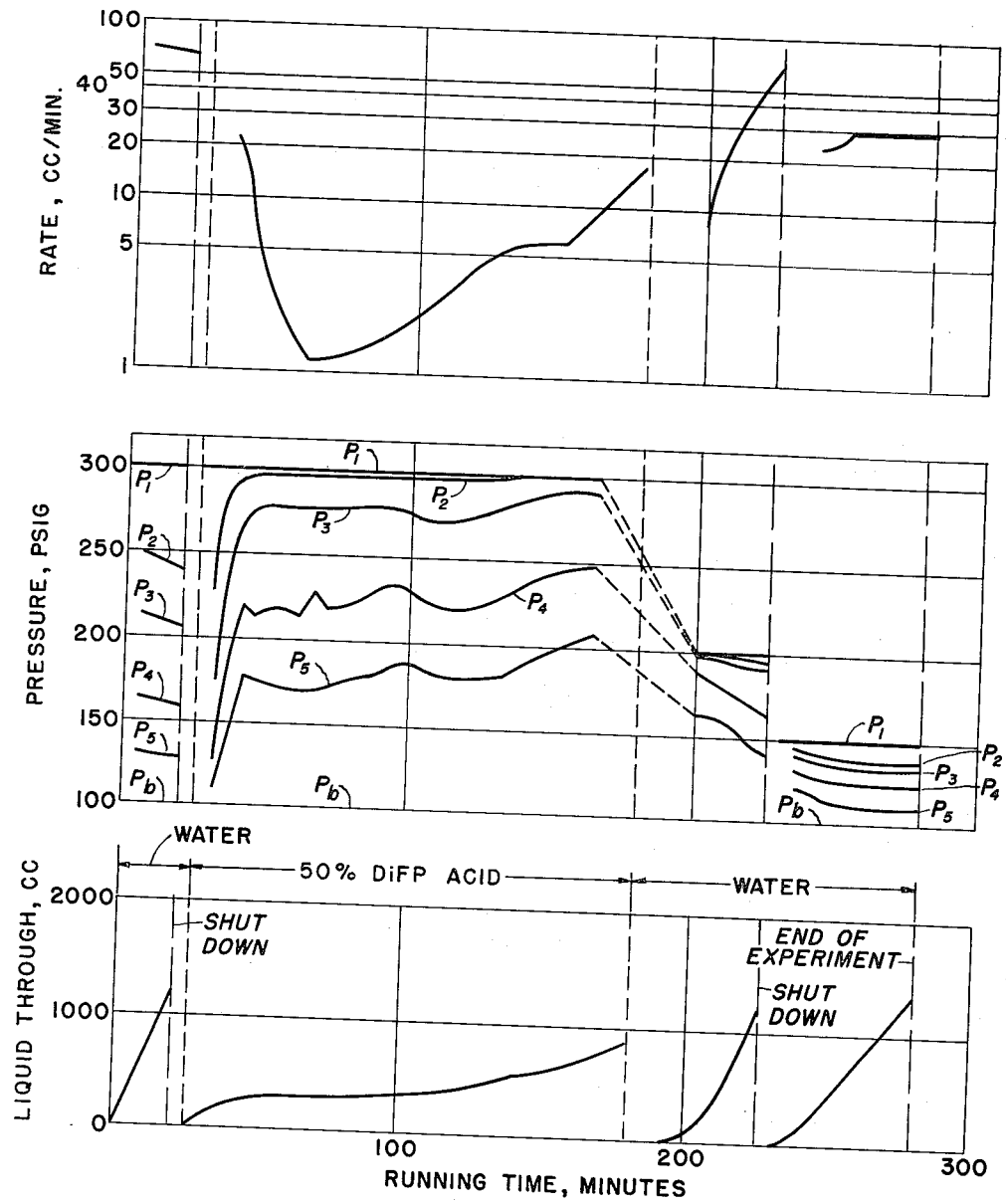

April 17, 1956

D. C. BOND 2,742,092

ACID TREATING SILICEOUS FORMATIONS

Filed July 1, 1952

2 Sheets-Sheet 1

FP ACIDIZING SANDSTONE SATURATED WITH DISTILLED WATER

INVENTOR.
DONALD C. BOND

BY Edward H. Lang

FP ACIDIZING SANDSTONE SATURATED WITH DISTILLED WATER

2,742,092

ACID TREATING SILICEOUS FORMATIONS

Donald C. Bond, Crystal Lake, Ill., assignor to The Pure Oil Company, Chicago, Ill., a corporation of Ohio Application July 1, 1952, Serial No. 296,599

11 Claims. (Cl. 166—42)

This invention relates to the acid treatment of geological formations. It is more specifically directed to improvements in the acid treating of siliceous geological formations with fluophosphoric acids.

The increased utilization of petroleum products has resulted in the need for an increase in the amount of crude oil produced. Furthermore, expanding industrial facilities have produced greater demands for additional well supplied water. This increase in the production requirements of oil and water must be substantially met by the completion of new producing wells and increase in the potential of old wells. Various techniques including acidization are available for effecting these results. However, acidization procedures have been restricted generally to application in limestone, dolomite or other types of calcareous formations using hydrochloric acid as the acidizing medium. Reagents such as hydrofluoric acid and its derivatives, described in the prior art as media for acidizing siliceous formations, have had shortcomings which have made their use inadvisable. Recent significant developments in this phase of acidizing, however, have provided a reagent which will react with siliceous formations to increase their permeability without the attendant difficulties experienced in using the chemical reagents previously used. In United States Patent Number 2,664,398 there is described the use of fluophosphoric acids in the acid treating of siliceous formations for increasing the productivity of wells. It has now been found that the efficacy of these methods may be enhanced by employing a manipulative procedure not heretofore used in conventional acidizing techniques.

It is therefore an object of this invention to treat siliceous geological formations with fluophosphoric acids to obtain improved results. This and other objects and advantages will be evident from the following discussion of the subject invention.

In the drawing:

Figure 1 is a graphical presentation showing the effect of acid treating siliceous rocks with 50 per cent by weight solutions of fluophosphoric acid under conditions simulating the acid treatment of geological formations containing substantially fresh formation waters. Graphical summarizations are shown for the results of observations made during the acid treatment of a sandstone core under experimental conditions where in the course of a single experiment three variables, viz, rate of liquid throughput which is the volume of liquid passing through the core, pressure at intermediate points along the core, and volume of liquid throughput, were concomitantly recorded and correlated with elapse in time occurring during the experiment represented as a common abscissa for each summarization.

Figure 2:
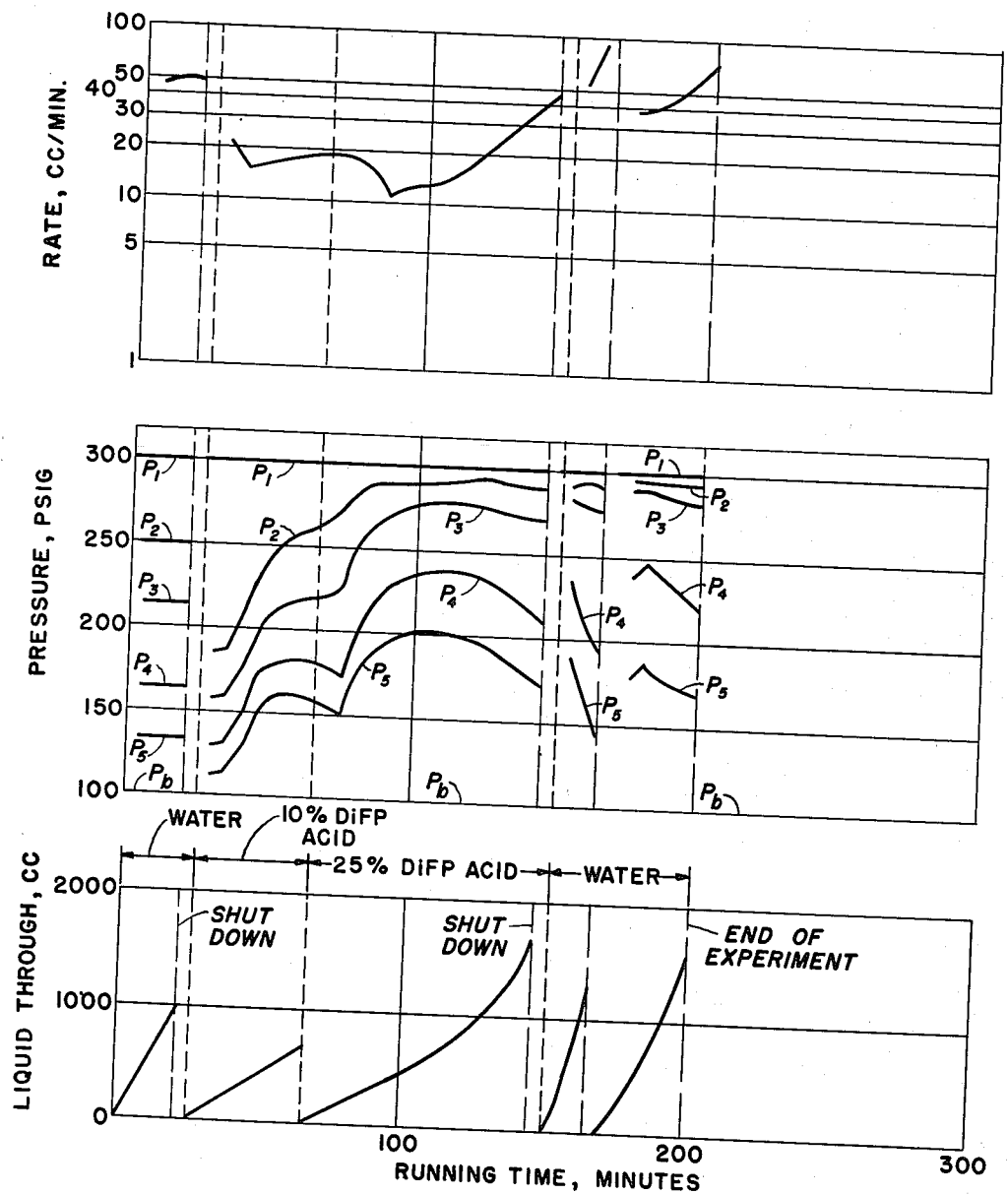

Figure 2 is a graphical presentation showing the effect of acid treating siliceous rocks by means of an acid treatment wherein aqueous solutions of varying fluophosphoric acid concentrations are sequentially employed. Graphical summarizations are shown for the results of observations made during the acid treatment of a sandstone core under experimental conditions where in the course of a single experiment three variables, viz, rate of liquid throughput which is the volume of liquid passing through the core, pressure at intermediate points along the core, and volume of liquid throughput, were concomitantly recorded and correlated with elapse in time occurring during the experiment represented as a common abscissa for each summarization.

It is shown in the foregoing patent that while fluophosphoric acids in general may be used as acidizing agents for treating siliceous formations, the reactivity of these fluophosphoric acids is dependent upon the concentrations of the acids. This latter feature is illustrated in the aforementioned United States patent where it is shown that aqueous fluophosphoric acid solutions containing 50 per cent by weight of fluophosphoric acid are the most reactive and that increasing the concentration of the fluophosphoric acid in excess of about 50 per cent by weight decreases the reactivity of the fluophosphoric acidizing reagent. It has now been found that although acid concentrations of about 50 per cent by weight are the most reactive, they do not necessarily provide the most effective acidizing results when used solely. Therefore, according to the invention, the permeability of siliceous geological formations may be increased more efficaciously by initially injecting a dilute fluophosphoric acid into the formation and thereafter gradually increasing the acid concentration until a concentration of about 50 per cent by weight is attained.

To illustrate the instant invention, several tests were made employing rectangular sandstone cores approximately 12 inches in length and having cross-sectional dimensions of 1½ inches by 2 inches. These cores are suitably mounted in a metal core holder which was provided with a plurality of pressure taps longitudinally located along the length of the core. These pressure taps extended into the core and were connected to suitable pressure measuring means. Thus the pressures existing adjacent each respective pressure tap were made manifest. These pressures are indicated on the several graphs in the drawings as $P_n$, $P_1$ being the inlet pressure, $P_5$ being the outlet pressure and $P_2$, $P_3$ and $P_4$ being the intermediate pressures therebetween. The core holder was connected to a series of storage reservoirs by means of a piping manifold system. The exit end of the core holder was connected to a recovery system which was designed to permit the measurement of effluent emitted from the core during the treatment operation. The reservoirs contained the various liquid treating reagents, such as various acids and water, which were utilized in the experiments. The siliceous cores employed in the acidizing experiments were prepared from a Berea sandstone which has a composition substantially similar to siliceous geological formations encountered during the drilling of earthen boreholes. In carrying out these experiments the core was first evacuated and then water was passed through the core under pressure. When the water started flowing from the outlet end of the core, the vacuum was removed and readings taken of the water rate. When the water rate and core pressures leveled off, the chemical reagent next employed in the experiment was then passed through the core by proper manipulation of the piping manifold system. This initial step is represented on the graphs in Figures 1 and 2 by the first family of curves having their inception at about zero time. This process was repeated until all of the desired reagents had passed through the core. Rate, pressure and throughput data correlated with time were obtained for each fluid employed and then data for each fluid were graphically reported as shown on the graph separate and distinct from the data representing the flow characteristics of each of the other fluids. For example, in Figure 1 the results for the specific experiment are shown wherein water was initially used, followed by the utilization of an acid reagent. The experiment was then terminated by passing additional amounts of water through the core. The results of each phase are shown separately although the entire procedure was considered as one experiment. The initial step of passing water through the core is shown in the first section of each of the graphical summarizations. The lapse of time required for manipulating the flow system to permit the use of the chemical reagent is represented by the next section of the summarization defined by the two immediately adjacent broken lines. No data was recorded during this period. As soon as the reagent began to flow in the core, the rate, pressure within the core, and liquid throughput correlated with elapse in time, were observed and recorded. During this investigation of the process of this invention, it was noted that during the acid treatment of the core, the flow rate would gradually increase. Therefore, in order to keep the flow rates within reasonable limits, the inlet pressure $P_1$ was decreased. This is shown in Figure 1 in that graph devoted to a summarization of pressure information obtained during the acidizing process. In this instance it is noted that the initial flow of water through the core was induced at a pressure of 300 p. s. i. g. Similarly, the introduction of the acid was carried out at this same pressure. However after the acidization step had been completed resulting in a decrease in the resistance of the core to the flow of fluids therethrough, only 200 lbs. per sq. inch pressure was employed to force the water through the formation in order to avoid the use of an inordinate rate. As soon as the water rate increased substantially, the pressure at which the water was forced into the formation was again reduced to 150 lbs. As a result of the reduction in inlet pressure, the intermediate pressure points $P_2$ through $P_5$, inclusive, were correspondingly decreased. In order to avoid confusion due to a renumbering of the data lines, dotted lines were employed to interconnect the corresponding pressure points in order to provide a proper description of the pressure data without resorting to a specific re-numbering of the pressure information lines. In order to more closely simulate field conditions, an artificial back pressure, $P_b$, was provided by connecting a source of pressure in the form of an inert gas, such as nitrogen, to the discharge end of the core. During the course of the separate experiments, the liquid effluent throughput and rate thereof was noted as well as the pressure conditions existing at the pressure taps located in the core holder and recorded as $P_n$ as hereinbefore discussed. To facilitate an interpretation of the results obtained, Figures 1 and 2 in the accompanying drawing were prepared from the data thus obtained. In the experiment providing the data from which Figure 1 was produced, a 50 per cent by weight aqueous solution of di fluophosphoric acid was employed as the acidizing medium and a back pressure, $P_b$, of 100 pounds per square inch was impressed upon the system. The core was initially saturated with distilled water to provide conditions similar to those occurring in formations which contain fresh connate waters. The acid was then forced into the core employing a threshold pressure, $P_1$, of 300 pounds per square inch. Figure 1 shows the results of this experiment. It will be noted that the flow rate after falling to a minimum value, which was about 1/50 of the initial rate of the water through the core, gradually increased until after an elapsed time of about 175 minutes a flow rate of about 15 cc. per minute of effluent was obtained. To illustrate the instant invention the acidizing of the siliceous core was then effected under similar conditions by initially injecting a dilute aqueous solution of di fluophosphoric acid. After the dilute fluophosphoric acid had caused an increase in the permeability of the core, a more concentrated fluophosphoric acid was then introduced. In this experiment 10 per cent by weight and 25 per cent by weight of solution of difluophosphoric acid were respectively employed. The results obtained in this experiment are shown graphically in Figure 2. From this figure it is seen that after a period of approximately 150 minutes has elapsed the flow rate obtained by using this expedient has increased to about 50 cc. per minute, a substantial increase over that shown in Figure 1 in which a longer period of time is reported. After this initial treatment with the more dilute concentrations of fluophosphoric acid is employed, the more reactive solution containing 50 per cent by weight of fluophosphoric acid described in my patent, supra, is then introduced into the formation in order to take advantage of the maximum reactivity evinced by fluophosphoric acidizing reagents having this concentration. It has been found that after this initial treat has been carried out, generally as great a permeability could be obtained as was desired. This permeability was limited only by the amount of fluophosphoric acid which was injected into the core at this time.

While the foregoing examples illustrate the effect of the instant invention when employed in treating siliceous formations containing fresh connate waters, the same effect is evinced when siliceous formations containing saline formation waters are treated. In employing the instant invention in treating these formations, it is only necessary that the formation be flushed with an aqueous flushing medium, such as hydrochloric acid, in accordance with the invention described in United States patent application Serial Number 263,128, filed December 24, 1951. For example, it is preferred in treating brine containing siliceous formations that a dilute aqueous solution of hydrochloric acid containing about 5 per cent by weight of hydrogen chloride be used to flush the formation prior to introducing the acidizing medium into the formation. The volume of the hydrochloric acid employed normally should be at least equal to the volume of acidizing solution used.

In carrying out the instant invention, any of the fluophosphoric acids may be employed. These include anhydrous mono fluophosphoric acid, which is principally $H_2PO_3F$ with varying amounts of $HPO_2F_2$ and $H_3PO_4$ as impurities, anhydrous di fluophosphoric, or a concentrated aqueous solution of hexa fluophosphoric acid. However, it is preferred that the di fluophosphoric acid be used because of the increased reactivity evinced by this composition. The quantity of acid to be used will depend upon the extent of the formation being treated. The limits of acid treat should be from about 10 to 200 barrels of acid depending upon the thickness of the producing formation being treated. However, if the occasion demands, the quantity of acid used may be as high as 400 barrels or more. Furthermore, an inhibitor may be added to the acid treating solution to mitigate or prevent the corrosive effects of the acid solution on the metallic equipment exposed to the acid solution. Small amounts of arsenous oxide have been found to be effective in providing a corrosion inhibiting effect. The addition of about 1 to 2 per cent by weight of arsenous oxide inhibits the corrosive action of the acid solution on ferrous metals to the extent that only negligent corrosion is observed at ordinary temperatures. It is also preferred that surface active agents be added to the acid to facilitate its penetration into the formation.

During the liminal injection of the fluophosphoric acid-containing treating reagent into the formation, it is preferred that the proportion of anhydrous acid to water be small. For example, a treating solution containing about 10 per cent by weight of fluophosphoric acid will provide effective results although smaller amounts of fluophosphoric acid may be employed. The acid:water ratio should be gradually increased to about 1:3 when about 25 per cent of the total acid to be utilized has been injected into the formation. The acid:water ratio should then be gradually increased to about 1:1 when 50 per cent of the total amount of fluophosphoric acid has been injected. This solution is then employed for the rest of the treatment. As an alternative to the incremental varying of the acid concentration, it is possible to use a stepwise variation in the acid concentration. For example, acid concentrations of about 10 per cent by weight, 25 per cent by weight and 50 per cent by weight aqueous solutions of fluophosphoric acid may be sequentially employed. It is to be understood that the foregoing procedures are merely preferred and are only illustrative of the instant invention. Other alternatives and variations in techniques and acid concentrations may be employed and are considered within the scope of this invention. Conventional acid treating equipment may be employed to introduce the acid treating solutions into the desired subterranean location. In carrying out the instant invention aqueous solutions of the acid are, of course, utilized. These treating solutions may be prepared by intermixing the acid into the water prior to the injection of the particular treating solution into the well. When this method is employed, the acidizing procedures described in United States Patents 1,891,667 or 2,018,199 to Carr may be employed. However, it is preferred that the acid treating solutions be prepared by mixing the acid and the water at the face of the formation which is to be treated. This procedure utilizes a relatively small bore tubing or "macaroni string" to inject the anhydrous acid. The string extends from the surface of the well to the bottom of the interval in which it is desired to apply the acid. The tubing head connections are arranged so that the anhydrous acid may be pumped into the "macaroni string" and simultaneously therewith water be introduced into the annular spacing between the "macaroni string" and the wall of the well. When this procedure is employed, the mixing of the water and the anhydrous acid will take place at the face of the formation. Where highly permeable formations are encountered it is practical to use the jet method of acidizing wherein the treating solution is pumped at high pressures against the face of the producing formation.

It is therefore seen that by means of the instant invention increased benefits are obtained from the use of fluophosphoric acids than have heretofore been provided.

Accordingly, I claim:

1. In a process for acid treating a siliceous geological formation to increase the permeability thereof wherein an aqueous solution containing fluophosphoric acid is employed as the acidizing medium, the steps which comprise initially forcing an aqueous solution having a fluophosphoric acid concentration of not more than about 10% by weight into the formation in an amount sufficient to react with said formation and increase the permeability thereof and thereafter utilizing an aqueuos acid treating solution having a fluophosphoric acid concentration in excess of that acid concentration initially employed in an amount not in excess of 50% by weight, but sufficient to react further with the formation and provide a supplemental increase in the permeability of said formation.

2. In a process for acid treating a substantially fresh connate water-containing siliceous geological formation to increase the permeability thereof wherein an aqueous solution containing fluophosphoric acid is employed as the acidizing medium, the steps which comprise initially forcing an aqueous solution having a fluophosphoric acid concentration of not more than about 10% by weight into the formation in an amount sufficient to react with said formation and increase the permeability thereof and thereafter utilizing an aqueous acid treating solution having a fluophosphoric acid concentration in excess of that acid concentration initially employed, but not in excess of 50% by weight, in an amount sufficient to react further with the formation and provide an incremental increase in the permeability of said formation.

3. In a process for acid treating a substantially fresh connate water-containing siliceous geological formation to increase the permeability thereof wherein an aqueous solution containing fluophosphoric acid is employed as the acidizing medium, the steps which comprise initially forcing an aqueous solution having a fluophosphoric acid concentration of about 5–10 per cent by weight into the formation in an amount sufficient to react with said formation and increase the permeability thereof and thereafter utilizing an acid treating solution having a fluophosphoric acid concentration in excess of that acid concentration initially employed, but not in excess of 50% by weight, in an amount sufficient to react further with the concentration and provide an incremental increase in the permeability of said formation.

4. In a process for acid treating a substantially fresh connate water-containing siliceous geological formation to increase the permeability thereof wherein an aqueous solution containing fluophosphoric acid is employed as the acidizing medium, the steps which comprise the stepwise addition of acidizing medium into the formation wherein the fluophosphoric acid concentration of the treating solution initially employed is not more than about 10% by weight and is thereafter stepwise increased to not more than about 50% by weight, the total amount of acidizing medium employed being sufficient to increase the permeability of said formation.

5. A method in accordance with claim 4 in which acid concentrations of about 10 per cent by weight, 25 per cent by weight and 50 per cent by weight of fluophosphoric acid are respectively employed in the stepwise treating of the siliceous formation.

6. In a process for acid treating a siliceous geological formation containing substantially fresh formation waters wherein an aqueous solution containing fluophosphoric acid is employed as the acidizing medium, and steps which comprise initially forcing a solution containing a concentration of fluophosphoric acid of not more than about 10% by weight into the formation and thereafter incrementally varying the fluophosphoric acid concentration of the acidizing medium, not to exceed 50% by weight, until an acidizing solution having a maximum reactivity is employed, the total quantity of aqueous fluophosphoric acid solution being sufficient to increase the permeability of said formation.

7. In a process for acid treating a siliceous geological formation containing substantially fresh connate waters wherein an aqueous solution containing fluophosphoric acid is employed as the acidizing medium, the steps which comprise initially forcing a solution having a fluophosphoric acid concentration of about 10 per cent by weight of fluophosphoric acid into the formation, thereafter utilizing a fluophosphoric acid containing acidizing medium in which the concentration of said acidizing medium is incrementally varied until the acidizing medium contains 50 per cent by weight of fluophosphoric acid and adjusting the incremental increase in concentration until a treating medium having a concentration of about 50 per cent by weight of fluophosphoric acid is being employed by the time that about one-half of the total amount of fluophosphoric acid containing treating medium has been forced into the formation, the total amount of treating medium employed being sufficient to react with and increase the permeability of said formation.

8. In a process for acid treating a siliceous geological formation containing saline connate waters, the steps which comprise flushing said formation with an aqueous flushing medium in an amount sufficient to prevent the subsequent precipitation of reaction products produced by reaction between the fresh or spent acid treating medium and the saline water, thereafter forcing an aqueous solution having a fluophosphoric acid concentration of about 5–10% by weight into the formation in an amount sufficient to react with said formation and increase the permeability thereof and thereafter utilizing an aqueous treating solution having a fluophosphoric acid concentration in excess of that acid concentration initially employed, but not in excess of 50% by weight, in an amount ufficient to react further with the formation and provide an incremental increase in the permeability of said formation.

9. A method in accordance with claim 8 in which the aqueous flushing medium is a dilute aqueous solution of hydrochloric acid.

10. A method in accordance with claim 9 in which the dilute hydrochloric acid flushing medium has a hydrochloric acid concentration of about 5 per cent by weight.

11. A method in accordance with claim 10 in which the volume of flushing medium employed is at least equal to the total volume of the acid treating solution employed.

References Cited in the file of this patent

UNITED STATES PATENTS

| 1,990,969 | Wilson | Feb. 12, 1935 |
| 2,225,695 | Henderson et al | Dec. 24, 1940 |
| 2,367,350 | Heigl | Jan. 16, 1945 |
| 2,664,398 | Bond | Dec. 29, 1953 |

OTHER REFERENCES

Acidizing Handbook, Kingston, copyright 1947, pages 87 and 88.